United States Patent

Kramer, Jr.

[15] 3,647,303
[45] Mar. 7, 1972

[54] RING LASER HAVING MEANS FOR PREVENTING MODE LOCKING

[72] Inventor: Charles J. Kramer, Jr., Fort Lee, N.J.
[73] Assignee: The Bendix Corporation
[22] Filed: Sept. 5, 1969
[21] Appl. No.: 855,677

[52] U.S. Cl. .................................. 356/106 LR, 331/94.5
[51] Int. Cl. .................................. G01b 9/02, H01s 3/00
[58] Field of Search .................................. 356/106; 331/94.5

[56] References Cited

UNITED STATES PATENTS

| | | | |
|---|---|---|---|
| 3,323,411 | 6/1967 | Killpatrick | 356/106 |
| 3,480,878 | 11/1969 | Macek | 356/106 |
| 3,506,362 | 4/1970 | Doyle et al. | 356/106 |

*Primary Examiner*—Ronald L. Wibert
*Assistant Examiner*—V. P. McGraw
*Attorney*—Peter C. Van Der Sluys and Plante, Hartz, Smith and Thompson

[57] ABSTRACT

A ring laser having laser beams traveling in opposite directions and a polarizer for circularly polarizing the beams in the same sense to reduce beam coupling within the lasing medium and for rejecting back scattered light to prevent oscillation of the back scattered light and reduce beam interaction.

14 Claims, 2 Drawing Figures

INVENTOR.
CHARLES J. KRAMER JR.

AGENT

RING LASER HAVING MEANS FOR PREVENTING MODE LOCKING

BACKGROUND OF THE INVENTION

1. Field of the Invention

The invention relates to ring lasers and more particularly to ring lasers having means for preventing mode locking.

2. Description of the Prior Art

Ring lasers have several uses, one being a gyro having no moving parts and uneffected by acceleration or orientation. They also have been used for highly sensitive and accurate fluid flow meters and in devices for studying changes in the refractive index of materials.

Heretofore ring lasers have experienced mode locking when the difference in beam frequencies was below a certain lock-in frequency. At frequency differences below the lock-in level the frequencies would spontaneously coincide. This was caused by mode pulling or coupling within the lasing medium and energy exchange between light in one beam and back scattered light from the other beam. These effects precluded the use of ring lasers at frequency differences below the lock-in frequency.

Energy exchange is generally considered to be caused by back scattered light from one beam reinforcing the other beam when the frequencies of the two beams are nearly equal. See M. Bass, H. Stotz and G. A. De Mars, J. Appln. Phys. 342,289 (1963). Practical limitations seem to prevent total elimination of back scatter; therefore, in the prior art a frequency bias was used to separate the frequencies of the two beams to prevent mode locking. The use of a frequency bias also reduced the mode coupling effects within the lasing medium.

Various bias techniques were used but they all tended to introduce errors and did not provide a solution that went to the source of the problem. One technique was to physically rotate the entire ring laser to introduce a bias rotation rate and a corresponding frequency difference. This technique proved to be cumbersome, costly and subject to errors caused by acceleration and gravitation, the same errors experienced in conventional gyroscopes.

A second technique was to separate the beam frequencies by introducing an optical element into the beam path to change the optical path length of the beams depending on the direction of travel therethrough. These devices were active elements and therefore subject to variations and resulting errors. One such device was a magnetic field in a Faraday Cell wherein errors would result from variations in the magnetic field.

A third technique provided a frequency bias by use of the Zeeman energy level splitting effect. This technique also required a magnetic field and was therefore subject to its variations.

SUMMARY OF THE INVENTION

The present invention contemplates a ring laser having two laser beams traveling in opposite directions. Means, such as a Fresnel Prism, is located in the beam paths to circularly polarize the light. The Fresnel Prism passes circularly polarized light of one sense and rejects circularly polarized light of the opposite sense. When circularly polarized light from one beam is reflected or back scattered into the other beam it experiences a reversal of sense and is rejected by the Fresnel Prism. The light beams are each circularly polarized in the same sense and back scattered light is rejected to prevent oscillation of the back scattered light in the laser cavity thereby reducing energy exchange and beam interaction.

Linearly polarized light is a combination of oppositely sensed circularly polarized light. Therefore, a linearly polarized light beam comprises photons having oppositely orientated angular momentums. For an atom in a lasing medium to emit energy into a light beam the atom must have the proper energy level, the proper angular momentum and the proper orientation of angular momentum. When two linearly polarized light beams enter a lasing medium from opposite directions, any one atom in the lasing medium may emit energy into either of the two beams since each beam has photons having an angular momentum orientation corresponding to the angular momentum orientation of the atom.

When two beams of a ring laser are circularly polarized in the same sense as contemplated by the present invention the photons in one beam all have the same orientation of angular momentum, which is opposite from the orientation of angular momentum of the photons in the other beam. An individual atom in the lasing medium can only emit energy into the beam having photons with an orientation of angular momentum corresponding to the orientation of angular momentum of the atom. Thus mode coupling within the lasing medium is reduced.

One object of the invention is to provide a ring laser which operates at low frequency differentials.

Another object of the invention is to provide a ring laser which does not mode lock.

Another object of the invention is to provide a ring laser using circularly polarized light.

The foregoing and other objects and advantages of the invention will appear more fully hereinafter from a consideration of the detailed description which follows, taken together wit the accompanying drawings wherein several embodiments of the invention are illustrated by way of example.

DESCRIPTION OF THE INVENTION

Figure 1:
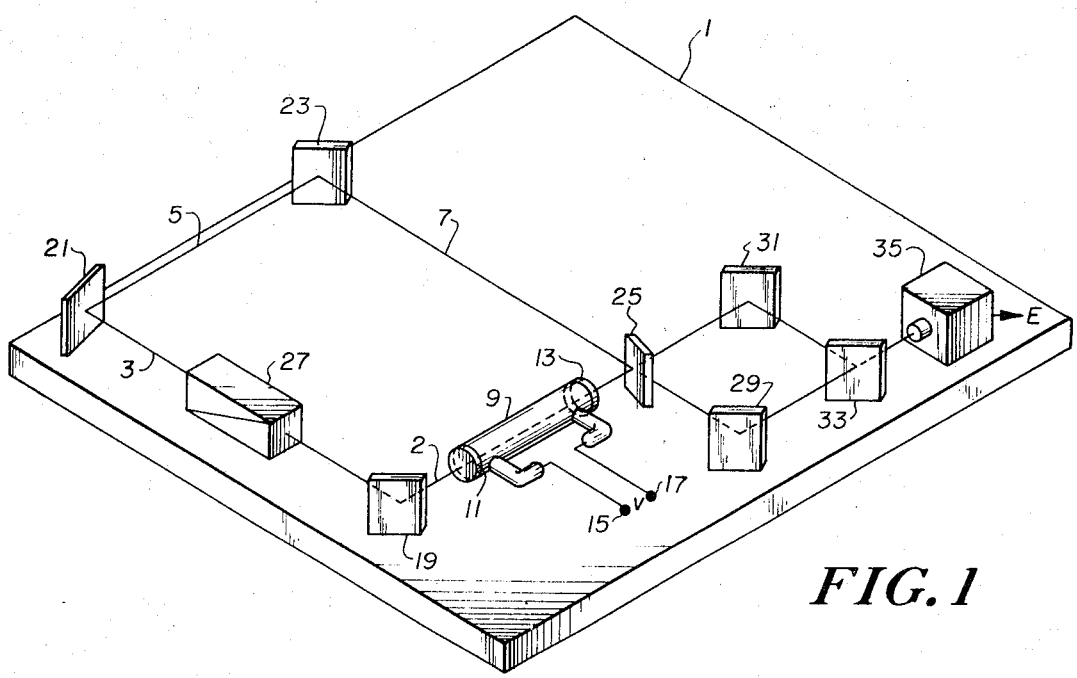
In FIG. 1 there is shown a ring laser having an even number of beam paths constructed in accordance with the present invention.

Referring to FIG. 1 there is shown a ring laser 1 having a laser cavity formed by four beam paths 2, 3, 5, and 7. The paths form a parallelogram which is preferably a square but not necessarily so. The ring laser may be used as a gyro to sense rotation about an axis perpendicular to a plane formed by the four beam paths and provide a signal E corresponding to the rate of rotation.

A laser gain tube 9, containing a gas lasing medium and having parallel end plates 11 and 13 antireflection coated for high transmission, is positioned in path 2 for providing two columnar beams of unpolarized light traveling in opposite directions along path 2. Gain tube 9 has terminals 15 and 17 for receiving voltage V which energizes the gain tube. While the present embodiment utilizes a gas lasing medium the invention is not limited to a gas laser.

Four mirrors, 19, 21, 23 and 25 are positioned at the corners of the parallelogram to direct the light beams from the laser device around the cavity. A beam emitted from end plate 11 travels clockwise around the cavity while a beam from end plate 13 travels counterclockwise. The mirrors are multilayer dielectric coated and are polarization selective. The mirrors must be arranged so as not to favor one plane of polarization and to assure that the circularly polarized beams remain circularly polarized as they travel around the cavity and do not degenerate into an elliptical polarization. Thus mirrors 19 and 23 are TE coated and mirrors 21 and 25 are TM coated so that both the zero and 90° planes are equally favored as the beams travel about the cavity.

A circular polarizing prism 27, such as a Fresnel Prism, is positioned in beam path 3 to pass right circularly polarized light in both directions while refracting left circularly polarized light out of the cavity. Because of a sense reversal caused by the mirrors, paths 3 and 7 have right circularly polarized light traveling in both directions and paths 2 and 5 have left circularly polarized light traveling therein.

The Fresnel Prism comprises two prisms made of left-handed and right-handed quartz or other optically active substance. The prism receives one beam of polarized or unpolarized light which it separates into two divergent columnar beams of oppositely sensed circularly polarized light. The angle between the divergent beams need only be large enough to cause the left circularly polarized light to be refracted out of the cavity as it travels around the cavity. The operation of the Fresnel Prism is explained in Introduction to Modern Optics by Grant R. Fowels, published by Holt, Rienhart and Winston, Inc. at page 186. The Fresnel Prism is not limited to two prisms, since there are many operable combinations which may be used, the optimum depending upon cavity parameters.

When circularly polarized light from one beam is reflected or back scattered it maintains the same orientation of angular momentum but because of the opposite direction of travel it experiences a sense reversal. The reversed sense is opposite from the sense of the other beam causing the back scattered light to be refracted out of the cavity by the Fresnel Prism thereby preventing oscillation and interaction with the other beam. Thus the major cause of mode locking is eliminated.

An atom in a lasing medium can only emit energy into a light beam if it has the proper energy level, angular momentum and orientation of angular momentum. Thus an individual atom in a lasing medium can only emit energy into a light beam in which the angular momentum orientation of the photons therein corresponds to the angular momentum of the atom. Since the photons in each beam have oppositely oriented angular momentums one atom cannot emit energy into both beams at the same time and beam coupling is reduced. Even when the frequencies of both beams are equal and their energy levels overlap there is no beam interaction or mode coupling within the lasing medium as would result if linearly polarized light was used.

When the ring laser is rotated about an axis perpendicular to a plane formed by the beam paths the effective length of one beam path appears to increase and that of the other path decreases. Thus clockwise rotation of the ring laser causes the path length of the clockwise beam to increase a corresponding amount and the path length of the counterclockwise beam decreases. The frequencies of oscillation of the two beams change in accordance with the change in the path lengths and a difference between the frequencies corresponds to the rotation rate of the ring laser.

Mirror 25 is only partially reflective so that a portion of the light from the beams can pass therethrough. A pair of mirrors 29 and 31 are positioned to receive light from the clockwise and counterclockwise beams respectively and to reflect the light to a partially reflective mirror 33 which combines the beams and directs the combined beams to a photodetector 35. Photodetector 35 receives the beams and in response thereto provides an output signal E having a frequency equal to the difference in frequencies of the two beams.

The embodiment of the invention shown in FIG. 1 is not limited to a device having four beam paths it can be modified to have any even number of beam paths and additional gain tubes may be used to provide added gain. Various combinations of flat and curved mirrors may be used to facilitate ease of alignment. The preferred combination is three flat mirrors and one curved mirror.

Figure 2:
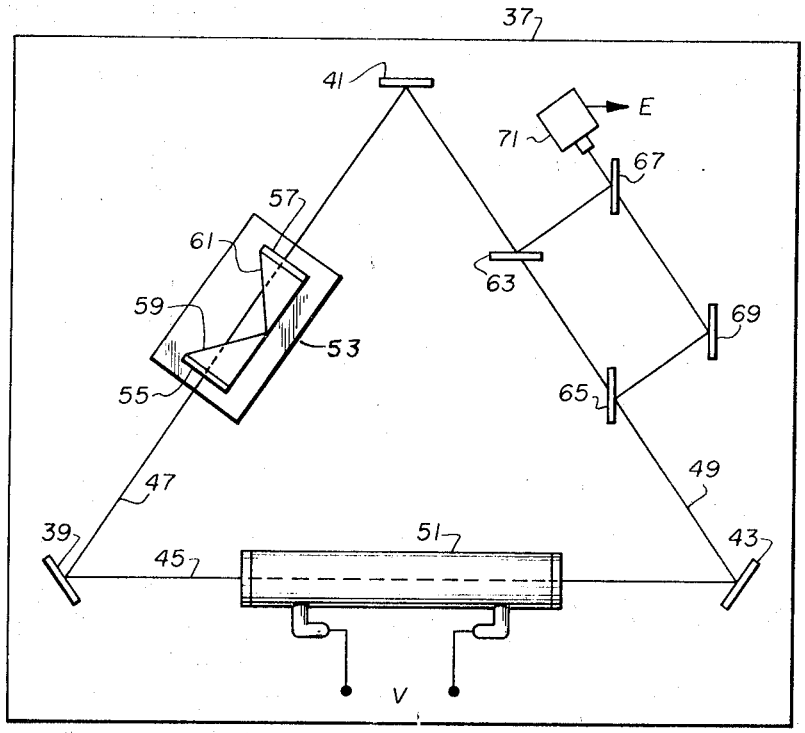
In FIG. 2 there is shown another embodiment of the present invention wherein the ring laser has an odd number of beam paths.

Referring to FIG. 2 there is shown another embodiment of the invention having an odd number of beam paths. A ring laser 37 has three mirrors 39, 41 and 43 forming three beam paths 45, 47 and 49 which form a laser cavity. A gain tube 51 is positioned in beam path 45 and provides two unpolarized columnar beams of light traveling in opposite directions along path 45 in the same manner as the laser device 9 shown in FIG. 1. A circular polarizer 53 is positioned in beam path 47 to intercept the unpolarized light and to provide circularly polarized light. Polarizer 53 provides a sense reversal of circularly polarized light passing therethrough. The sense of circularly polarized light passed by the polarizer depends upon the direction of light. Left circularly polarized light in path 47 of the clockwise beam is received by polarizer 53 which reverses the sense and provides right circularly polarized light to mirror 41. Right circularly polarized light in path 47 of the clockwise beam is blocked by polarizer 53. In a similar manner polarizer 53 receives right circularly polarized light from the counterclockwise beam and provides left circularly polarized light to mirror 39.

Polarizer 53 includes two parallel quarter wave plates 55 and 57 having fast axes aligned parallel to each other. A linear polarizer such as a pair of Brewster-angle Windows 59 and 61 are positioned between the quarter wave plates. The unpolarized light from gain tube 51 can be considered a random assortment of left and right circularly polarized light. Considering the light in the clockwise beam, quarter wave plate 55 converts the circularly polarized light to linearly polarized light. Left circularly polarized light is converted to linearly polarized light in a first plane and right circularly polarized light is converted to linearly polarized light in a second plane perpendicular to the first plane. The Brewster-angle Windows are positioned to pass only the linearly polarized light in the first plane. Quarter wave plate 57 converts the linearly polarized light passed by windows 59 and 61 into circularly polarized light of right-hand sense. Thus polarizer 53 provides a sense reversal to compensate for the odd number of mirrors around the ring so that the beams are of the same sense in paths 45 and 49. The polarizer operates in a similar manner on the light in the counterclockwise beam, receiving right circularly polarized light and providing left circularly polarized light.

The device of FIG. 2 operates in a manner similar to the device shown in FIG. 1. Reflected circularly polarized light reverse sense and is not passed by polarizer 53 thereby preventing oscillation of reflected light and reducing bean interaction. Beam coupling within the laser medium is prevented by the use of circular polarization as it was in the device of FIG. 1. Partially reflective mirrors 63 and 65 are positioned in path 49 to direct a portion of the light beams to mirrors 67 and 69 respectively. Mirror 67 combines the beams and directs them to a photodetector 71 which in response to the beams provides a signal having a frequency corresponding to the rate of rotation of the ring laser 37.

A polarizer similar in construction to polarizer 53 may be used in place of the Fresnel Prism in FIG. 1 if the fast axis of quarter wave plate 55 is aligned parallel to the slow axis of quarter wave plate 57. In such a configuration there is no sense reversal as the polarized light passes through the polarizer.

The present invention takes advantage of the natural properties of circularly polarized light. When linearly polarized light is back scattered the light remains in the same plane of polarization and cannot easily be detected and eliminated. Circularly polarized light experiences a sense reversal when it is back scattered and the sense reversal can be detected and the back scattered light eliminated easily from the cavity. Likewise beam coupling does not occur within the lasing medium because an individual atom can emit energy into only one of the circularly polarized beams at a time.

A ring laser constructed in accordance with the present invention is not affected by back scatter or mode coupling within the lasing medium. Elimination of beam interaction and mode coupling enables the device to measure rotation rates down to zero rotation without the need for a frequency bias that degrades the accuracy of the device.

What is claimed is:
1. A ring laser free from mode locking, comprising:
    a laser cavity having a closed loop path with a gain medium positioned in the closed loop path for providing two laser beams traveling in opposite directions around the path; and
    a circular polarizer positioned within the cavity in the closed loop path for circularly polarizing the two beams in the same sense;
    the circular polarizer and the gain medium being positioned and arranged in the closed loop path so that the light beams are circularly polarized in the gain medium and substantially throughout the entire closed loop path to reject back scattered light and reduce beam interaction and coupling to avoid mode locking.

2. A ring laser of the kind described in claim 1 for sensing a condition, having means for varying the optical lengths of the beam paths relative to one another in accordance with the condition to change the frequencies of the beams accordingly so that the difference in frequencies corresponds to the condition.

3. A ring laser as described in claim 2, including means for providing an output corresponding to the difference between the beam frequencies.

4. A ring laser as described in claim 1 in which the circular polarizer is arranged to refract oppositely sensed circularly polarized light out of the cavity.

5. A ring laser as described in claim 1, in which the circular polarizer is arranged to block oppositely sensed circularly polarized light.

6. A ring laser as described in claim 1, in which the air tube comprises a gas lasing medium and has flat parallel end plates coated for high transmission.

7. A ring laser as described in claim 1, in which the closed loop path comprises an even number of straight line paths and the two laser beams are circularly polarized in the same sense in each path.

8. A ring laser as described in claim 1, in which the closed loop forms a parallelogram.

9. A ring laser as described in claim 1, in which the closed loop forms a square.

10. A ring laser as described in claim 7, in which the circular polarizer comprises a Fresnel Prism.

11. A ring laser as described in claim 7, in which the circular polarizer passes one sense of circularly polarized light without a sense reversal and blocks the other sense of the circularly polarized light and comprises:
   a pair of quarter wave plates positioned perpendicular to one path of the loop and having their fast axes positioned perpendicular to each other; and
   linear polarizing means positions between the quarter wave plates.

12. A ring laser as described in claim 11, in which the linear polarizing means comprises a pair of Brewster Windows having coincident polarizing planes.

13. A ring laser as described in claim 1, in which the closed loop path comprises an odd number of straight line segments and the circular polarizer is positioned in one of the segments and provides a sense reversal of the polarized light passed therethrough so that the two beams are circularly polarized in the same sense in the other two paths.

14. A ring laser as described in claim 13, in which the circular polarizer passes one sense of circularly polarized light with a sense reversal and blocks the other sense of the circularly polarized light and comprises:
   a pair of quarter wave plates positioned perpendicular to one path of the loop and having their fast axes aligned parallel to each other; and
   linear polarizing means positioned between the quarter wave plates.

* * * * *